(12) United States Patent
Nikolaidis et al.

(10) Patent No.: US 11,160,298 B1
(45) Date of Patent: Nov. 2, 2021

(54) METHODS OF PRODUCING DECOLORIZED BEET PRODUCTS AND COMPOSITIONS PRODUCED THEREFROM

(71) Applicants: Alexander Nikolaidis, New Kallikratia (GR); Ronald Kramer, Phoenix, AZ (US)

(72) Inventors: Alexander Nikolaidis, New Kallikratia (GR); Ronald Kramer, Phoenix, AZ (US)

(73) Assignee: ThermoLife International, LLC, Phoenix, AZ (US)

( * ) Notice: Subject to any disclaimer, the term of this patent is extended or adjusted under 35 U.S.C. 154(b) by 709 days.

(21) Appl. No.: 15/601,970

(22) Filed: May 22, 2017

Related U.S. Application Data

(60) Provisional application No. 62/339,604, filed on May 20, 2016.

(51) Int. Cl.
| | | |
|---|---|---|
| *A23L 5/49* | (2016.01) | |
| *A23L 5/20* | (2016.01) | |
| *C09B 61/00* | (2006.01) | |
| *C09B 67/54* | (2006.01) | |

(52) U.S. Cl.
CPC ................................... *A23L 5/49* (2016.08); *A23L 5/20* (2016.08); *A23L 5/27* (2016.08); *A23L 5/276* (2016.08); *C09B 61/00* (2013.01); *C09B 67/0096* (2013.01)

(58) Field of Classification Search
CPC ..... A23L 5/49; A23L 5/20; A23L 5/276; A23L 5/27
See application file for complete search history.

(56) References Cited

U.S. PATENT DOCUMENTS

| | | | | |
|---|---|---|---|---|
| 3,248,264 | A * | 4/1966 | William | C13B 20/02 127/50 |
| 4,264,373 | A * | 4/1981 | Shinbori | C13B 20/123 127/55 |
| 6,454,946 | B1 * | 9/2002 | DeFrees | B01D 61/022 127/34 |

OTHER PUBLICATIONS

Busch, Sandi. "List All the Benefits of Beetroot Vitamin Supplements", Livestrong, Feb. 22, 2015, pp. 1-5, Retrieved from Internet URL: https://web.archive.org/web/20150222170200/https://www.livestrong.com/article/530288-list-all-the-benefits-of-beetroot-vitamin-supplements/. (Year: 2015).*

Wasserman et al., "Effect of Hydrogen Peroxide and Phenolic Compounds on Horseradish Peroxidase-Catalyzed Decolorization of Betalain Pigments", Journal of Food Science, vol. 49, pp. 536-538, 1984. (Year: 1984).*

Wruss et al., "Compositional characteristics of commercial beetroot productsand beetroot juice prepared from seven beetroot varietiesgrown in Upper Austria", Journal of Rood Composition and Analysis 42(2015) 46-55. (Year: 2015).*

* cited by examiner

*Primary Examiner* — Stephanie A Cox
(74) *Attorney, Agent, or Firm* — Booth Udall Fuller, PLC; Pacer K. Udall

(57) ABSTRACT

The present invention provides methods of producing decolorized beet products and compositions produced therefrom. In some implementations, the decolorized beet product is decolorized beetroot juice.

21 Claims, 2 Drawing Sheets

METHODS OF PRODUCING DECOLORIZED BEET PRODUCTS AND COMPOSITIONS PRODUCED THEREFROM

CROSS REFERENCE TO RELATED APPLICATIONS

This document claims the benefit of the filing date of U.S. Provisional Patent Application 62/339,604 entitled "METHOD OF PRODUCING DECOLORIZED BEET PRODUCTS AND COMPOSITIONS PRODUCED THEREFROM" to Alexander Nikolaidis and Ronald Kramer which was filed on May 20, 2016, the disclosure of which is hereby incorporated entirely herein by reference.

BACKGROUND

Beetroot is the taproot portion of the beet plant, usually known in North America as beet, table beet, garden beet, or red or golden beet. It is several of the cultivated varieties of *Beta vulgaris* grown for their edible taproots and their leaves (called beet greens). These varieties have been classified as *B. vulgaris* subsp. *vulgaris* Conditiva Group.

Beetroot has a high nutritive value, as they are an excellent source of folate and a very good source of manganese, potassium, and copper. They are also a good source of dietary fiber, magnesium, phosphorus, vitamin C, iron, and vitamin B6. Furthermore, beets have lately gained attention as a natural source of dietary nitrate. In particular, dietary nitrate has gained interest as an agent for increasing athletic performance, reducing blood pressure, and supporting cardiovascular health.

Unfortunately, consumption of beetroot for its nutritional benefits can lead to stress, concern, and unneeded doctor visits. Eating beetroots or foods colored with beetroot extract or beetroot pigments beetroot leads passing of red or pink urine, a condition called beeturia. The color is caused by the excretion of betalain (betacyanin) pigments such as betanin. The coloring is highly variable between individuals and between different occasions and can vary in intensity from invisible to strong. Although beeturia by itself is not dangerous of harmful, it can be easily mistaken for hematuria or bloody stools. On the other hand, beeturia can also mask symptoms of kidney or liver failure, urinary tract infection, or other conditions where the symptoms include dark red or brown urine. For populations consuming beetroot-based products as a fitness supplement, beeturia can mask evidence of overly working out, such as rhabdomyolysis.

The bright red color of the juice also causes other problems, such as easy staining of clothes and other artifacts and unwanted coloring of solutions/powders. Accordingly, there is a need for a way of getting the nutritional benefits of beetroot without the problems caused by betalain pigments.

SUMMARY

The invention relates to methods of decolorizing a beet product and compositions of decolorized or partially decolorized beet product that does not cause beeturia.

In one embodiment, the method of producing a liquid made from beets comprises providing a liquid made from beets; adding a decolorizing agent to the liquid made from beets to produce a decolorizing mixture; and mixing the decolorizing mixture for at least five minutes to produce a decolorized liquid made from beets. In particular implementations, the liquid made from beets may be beetroot liquid. Water is the preferable solvent used for the preparation of the liquid, but other solvents suitable for human consumption or that can be easily removed, such as ethanol, could also be used.

The decolorizing agent may be any number of agents that are suitable for human consumption. For example, the decolorizing agent may be selected from the group consisting of: potassium permanganate ($KMnO_4$), magnesium (Mg), and acetic anhydride. Other oxidizing or acetylating agents may also be suitable as a decolorizing agent. Additionally, nitrite salts (e.g., sodium nitrite) in 1000 ppm concentration for example may also be suitable decolorizing agents.

In some implementations, mixing the decolorizing mixture for at least five minutes to produce a decolorized liquid made from beets involves stirring the decolorizing mixture. For example, stirring the decolorizing mixture for at least five minutes.

In some implementations, the molar ratio of the decolorizing agent to the amount of pigment in the liquid made from beets is 1:1. In other implementations, the molar ratio of the ratio of the decolorizing agent to the amount of pigment in the liquid made from beets is no more than 20% less than 1:1.

In some implementations, the decolorizing agent is potassium permanganate in a quantity of 0.001%-2% w/w. In other implementations, the decolorizing agent is magnesium in a quantity of 0.01%-5% w/w to the beetroot liquid. In some aspects, the magnesium is in its pure form. In still another embodiment, the decolorizing agent is acetic anhydride in a quantity between 0.1% w/w and 50% w/w.

In some implementations, the method may further comprise bringing the liquid made from beets to room temperature prior to adding the decolorizing agent to the liquid made from beets, for example, when the decolorizing agent is potassium permanganate.

In other implementations, the method may further comprise bringing the decolorizing mixture to a temperature of preferably at least 60° C. When the decolorizing agent is magnesium, lower temperatures will still work, though they might prolong reaction time. Higher temperatures on the other hand might harm thermosensitive nutrients like vitamin C, for example. For these implementations, the method may further comprise maintaining the decolorizing mixture at a temperature of at least 60° C. for at least 20 minutes and cooling the decolorizing mixture once discoloration occurs.

In still another implementation, the methods further comprise adding a catalyst to the decolorizing mixture. The catalyst may be a carbonate salt (for example $CH_3CHOONa$, $CH_3COOK$, $(CH_3COO)_2Ca$, $(CH_3COO_2)Mg$), or $CuSO_4$. For example, when the decolorizing agent is acetic anhydride, the catalyst may be a pyridine. Preferably, the amount of pyridine in the decolorized liquid made from beets is no more than 200 ppm.

Some implementations of the methods comprise adding a base to the decolorizing mixture. The molar ratio of base to the decolorizing agent is between 0.1:1 and 1:1 or 1:1. In some aspects, the base is a bicarbonate, such as sodium bicarbonate or potassium bicarbonate.

To produce a solid beet product that does not cause beeturia, the step of evaporating water (or ethanol or some other solvent suitable for human consumption or that can be easily removed) of the decolorized liquid made from beets follows the method of producing a liquid made from beets.

The invention is also directed to decolorized beet compositions, for example compositions produced by the aforementioned methods of the invention. In some implementations, the decolorized beet composition is in a liquid form. For example, the liquid decolorized beet composition comprises a beet product selected from the group consisting of: beetroot juice, beetroot extract, beetroot tincture, and beetroot jam. In other implementations, the decolorized beet composition is in a solid form. For example, the solid decolorized beet composition comprises a beet product selected from the group consisting of: beetroot powder, powdered beetroot extract, and beetroot juice powder.

Accordingly, the decolorized beet composition comprises a liquid made from beets; and a decolorizing agent, wherein the decolorizing agent is selected from the group consisting of: an oxidizing agent and an acetylating agent. In some aspects, the molar ratio of the decolorizing agent to the amount of pigment in the liquid made from beets is 1:1. In a preferred embodiment, the liquid made from beet is a liquid made from beetroot. In some aspects, the decolorizing agent is selected from the group consisting of: potassium permanganate ($KMnO_4$), magnesium (Mg), and acetic anhydride.

Where the decolorizing agent is potassium permanganate, the decolorizing agent is in a quantity of 0.001%-2% w/w. Where the decolorizing agent is magnesium, the decolorizing agent is magnesium in a quantity of 0.01%-5% w/w. In some aspects, the magnesium is in its pure form. Where the decolorizing agent is acetic anhydride, the composition further comprises a base selected from the group consisting of: sodium bicarbonate and potassium bicarbonate. In some aspects, the acetic anhydride is 50% w/w acetic anhydride. In some implementations, the molar ratio of the base to the acetic acid is 1:1. In still some implementations where the decolorizing agent is acetic anhydride, the decolorized beet composition further comprises pyridine.

BRIEF DESCRIPTION OF THE DRAWINGS

FIG. 1A shows the color left on a t-shirt from a drop of beet juice and from a drop of decolorized beet juice. FIG. 1B shows the color left on the t-shirt after washing in warm water for one minute.

In FIG. 2A, the solution on the left is the decolorized beet juice while the solution on the right is the untreated beet juice. FIG. 2B is a view of the decolorized beet juice while FIG. 2C is a view of the untreated beet juice.

DETAILED DESCRIPTION

Figure 1A:
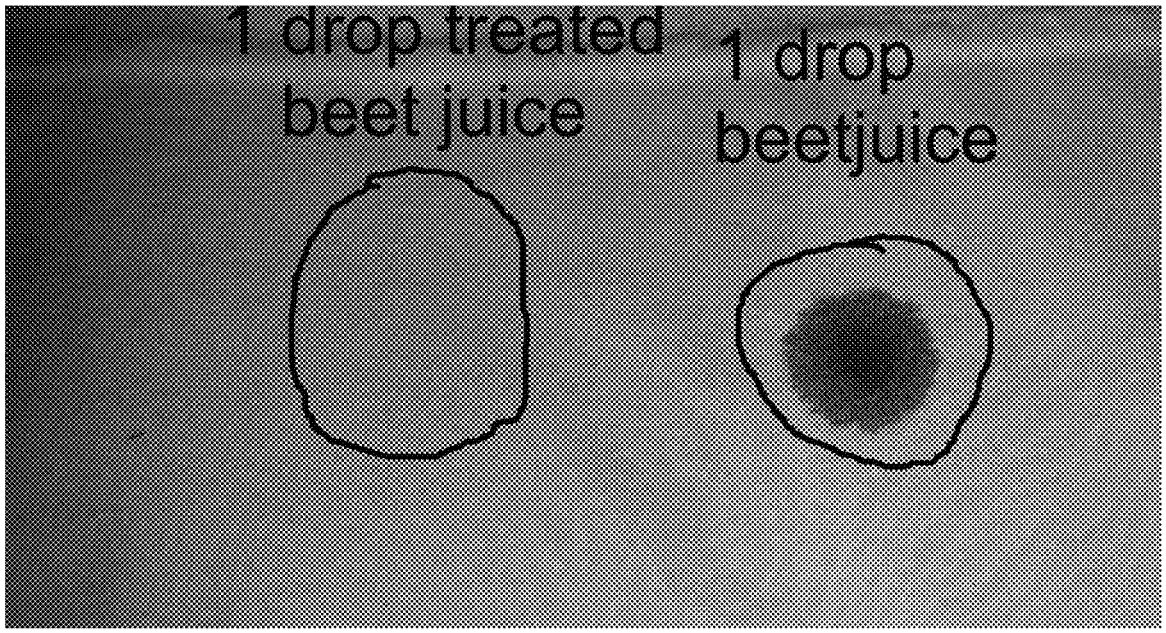
FIGS. 1A and 1B show the difference in staining properties of unprocessed beetroot product and decolorized beetroot.
Figure 1B:
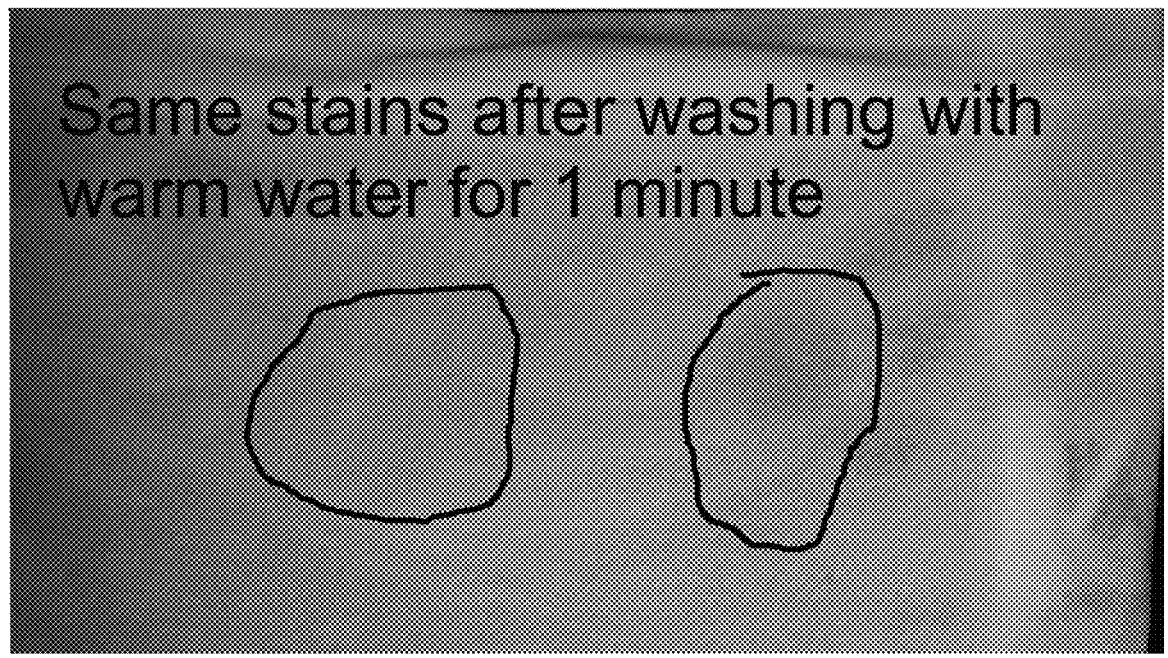

The present invention related to the discovery of various methods that safely, easily and economically removes the red color from the beet plant, for example the red color in the leaves or in beetroot juice and its derivatives. Derivatives of beetroot juice include beetroot liquid extract, beetroot extract powder, beetroot juice powder, beetroot jam, beetroot jelly, and beetroot reduction. As used herein, the term "beetroot liquid" refers not only to fresh beetroot juice but also to beetroot extract, reconstituted beetroot juice powder, dissolved beetroot powder, dissolved beetroot paste and the like. All these products after decolorization treatment can be reduced to solid form by evaporation of the water either by heating, by heating in vacuum, or by other suitable or similar methods (e.g. spray drying), yielding the respective solid products, such as decolorized beetroot powder or decolorized beetroot extract. Decolorized beetroot liquid may also be reduced by evaporation by any of the methods specified above to a more viscous state, such as beetroot jam, beetroot jelly, or beetroot reduction. Thus, the invention is directed to methods of removing the red color from beet and also methods of preventing beeturia. In preferred implementations, the invention is directed to methods of removing the red color from beetroot juice and its derivatives. The invention is also directed to compositions of decolorized beet or beetroot liquid. While decolorized beet products would still color clothes, it does not stain clothes as the color can be washed off (FIG. 1B). An unexpected improvement of decolorized beetroot products over its natural counterpart is that decolorized beetroot products have better flavor.

The method of removing the red color from beet or beetroot liquid comprise mixing a decolorizing agent with a liquid made from beets or beetroot liquid. The decolorizing agent is an oxidizing agent or an acetylating agent. For example, the decolorizing agent is selected from the group consisting of potassium permanganate ($KMnO_4$), magnesium (Mg), and acetic anhydride. The amount of decolorizing agent depends on the amount of red dye in the liquid made from beets or beetroot liquid. For full decolorization, the molar ratio of the decolorizing agent to the red pigment is 1:1. Typically, the amount of decolorizing agent added to the liquid made from beets or beetroot liquid is at least 0.001% w/w, at least 0.01% w/w, at least 0.1% w/w, or at least 0.1% w/w. For example, the amount of decolorizing agent added to the liquid made from beets or beetroot liquid is between 0.001%-50% w/w, for example between 0.001%-25% w/w, 0.001%-10% w/w, 0.001%-5% w/w, 0.001%-2.5% w/w, 0.001%-2% w/w, 0.001%4% w/w, or 0.001%-1% w/w. For potassium permanganate, the preferred range added to the liquid made from beets or beetroot liquid is 0.001%-2% w/w. For magnesium, the preferred range added to the liquid made from beets or beetroot liquid is 0.01%-5% w/w. For acetic anhydride, the preferred range added to the liquid made from beets or beetroot liquid is between 0.1% and 50% w/w. The decolorizing agent should be stirred into the beetroot liquid, preferably for at least five minutes. In some implementations, full decolorization of the beetroot liquid takes place between 5-10 minutes.

Depending on the decolorizing agent, the temperature of the beetroot liquid may be adjusted. For example, if the decolorizing agent is potassium permanganate, the beet liquid does not need to be heated to result in removal of the red color from the beet liquid. The decolorizing reaction can take place at room temperature, though the reaction can take place any in conditions between the freezing and boiling points of beet juice, −20° C. and 130° C. respectively. In preferred implementations, the reaction takes place between 10° C. and 50° C. Similar to potassium permanganate, acetic anhydride can decolorize beetroot liquid without requiring specific temperature conditions.

Unlike potassium permanganate and acetic anhydride, decolorizing beetroot liquid with magnesium requires warming the mixture of the beetroot liquid and magnesium. Using temperatures higher than 60° C. is generally not preferred, since temperature above 60° C. can destroy thermosensitive nutrients. Accordingly, in some implementations, the decolorizing beetroot liquid with magnesium may be warmed to at least 60° C. If the mixture is brought to at least 60° C., the mixture should be held at this temperature for at least 20 minutes. Of course, the temperature of the mixture may be lower than 60° C., but the beetroot liquid/magnesium mixture may lose its original color at a slower rate (i.e., reaction time might be slower). Accordingly, in some implementations, the decolorizing beetroot liquid with magnesium may be warmed anywhere from 30° C. to 60° C., in which case the mixture should be held at the lower temperature for longer than the minimum 20 minutes for 60° C. until the beetroot liquid/magnesium mixture starts to lose its original color, as a person having ordinary skill in the art would be aware. The mixture should also be stirred. Once the beetroot liquid/magnesium mixture starts to lose its original color, the mixture is then cooled.

The decolorizing methods may require a catalyst. For example, when the decolorizing agent is acetic anhydride, a pyridine or another suitable catalyst, such as a carbonate salt (for example $Na_2CO_3$, $K_2CO_3$, $Cs_2CO_3$, or $KHCO_3$), an acetate salt (for example $CH_3CHOONa$, $CH_3COOK$, $(CH_3COO)_2Ca$, $(CH_3COO_2)Mg$), or $CuSO_4$, may be added to the decolorizing mixture. Also, when acetic anhydride is the decolorizing agent, the mixture can be neutralized after decolorization by the addition of a base, for example, a bicarbonate. The addition of the bicarbonate also improves the taste of the decolorized liquid made from beets or beetroot liquid. In some implementations, the bicarbonate may be sodium bicarbonate or potassium bicarbonate.

The methods of the invention may further comprise evaporating water of the decolorized liquid made from beets or beetroot liquid. Such methods produce a solid decolorized beet product or a more viscous form of the decolorized liquid made from beets or beetroot liquid. The solid beet products include, but are not limited to, decolorized beetroot powder or decolorized beetroot extract. The more viscous the decolorized liquid made from beets or beetroot liquid include, but are not limited to beetroot jam, beetroot jelly, beetroot reduction, beet greens juice, or beet greens extract.

Persons skilled in the art will understand that the invention can be easily modified for various other uses where beetroot without red color is desirable. Such persons will also understand that the condition of beeturia may be avoided without consuming only decolorized beet products. For example, beeturia may be avoided by consuming beetroot products that have less red color (or reduced betalain pigments). Thus, a person having ordinary skill in the art would know one can use only a little of the decolorizing agents or mix the decolorized product with a normal-colored beetroot product. Accordingly, the compositions of the invention may comprise decolorizing agent at less than amounts used in the methods of decolorizing a liquid made from beets or beetroot liquid. For example, for partial decolorization of a liquid made from beets or beetroot liquid, the molar ratio of the decolorizing agent to the pigment is less than 1:1. In some implementations, the molar ratio of the decolorizing agent to the pigment may be reduced by 20%, 15%, 10%, or 5% and still result in sufficient decolorization of the liquid made from beets or beetroot liquid to prevent beeturia.

In some aspects, the compositions of decolorized liquid made from beets or beetroot liquid comprise liquid made from beets or beetroot liquid and a decolorizing agent. Depending on the decolorizing agent, a catalyst may also be part of the composition. For example, if the decolorizing agent is acetic anhydride, the catalyst may be pyridine. If pyridine were used as a catalyst in the methods, the amount added to the decolorizing mixture does result in more than 200 ppm pyridine in the decolorizing mixture. In some implementations, the composition may comprise a food additive for enhancing the flavor, such as a mineral salt. For example, when the decolorizing agent is acetic anhydride, the addition of a bicarbonate, preferably potassium bicarbonate or sodium bicarbonate, neutralizes the acetic acid produced from the decolorizing reaction and improves the taste of the resulting decolorized beetroot product. In preferred implementations, the molar ratio of acetic anhydride to the bicarbonate is 1:1. In some implementations where an acidic decolorized beetroot product is desired, the molar ratio of acetic anhydride to the bicarbonate is more than 1 mole of acetic anhydride to 1 mole of bicarbonate, but not more than 10 moles of acetic anhydride to 1 mole of bicarbonate. For example, 10:1, 9:1, 1:8, 1:7, 1:6, 1:5, 1:2, 1:3, or 1:2. In some implementations, where an alkaline juice product is desired (such as a carbonated liquid), the molar ratio of acetic anhydride to the bicarbonate is between 1:1 to 1:10, for example about 1:2, 1:3, 1:4, 1:5, 1:6, 1:7, 1:8, 1:9, or 1:10.

The present invention is further illustrated by the following examples that should not be construed as limiting. The contents of all references, patents, and published patent applications cited throughout this application, as well as the Figures, are incorporated herein by reference in their entirety for all purposes.

EXAMPLES

Method 1:
Beetroot liquid is brought to room temperature, and potassium permaganate ($KMnO_4$) in a quantity of 0.1-0.2% w/w is added. The mixture is stirred for at least five minutes. The end product is a dark brown liquid with no traces of red color that does not cause beeturia. This method does not require boiling and is relatively cheap and fast.
Composition 1:
Beetroot liquid
0.1-0.2% w/w potassium permanganate ($KMnO_4$)
Method 2:
Magnesium in its pure form is added to beetroot liquid in a quantity of 0.01%-1.0% w/w, for example 0.1% w/w. The mixture is brought at a temperature of at least 60° C. and held at this temperature for at least 20 minutes. During the entire process, the mixture is stirred to ensure proper mixing of the magnesium and the beetroot liquid. After the beetroot liquid starts losing its original color, for example becomes less red, the mixture is left to cool down. The result is a light brown liquid.
Composition 2:
Beetroot liquid
0.01%-1.0% w/w Magnesium
Method 3:
Acetic anhydride in a quantity between 0.1% w/w and 50% w/w but preferably 1% is added to the beetroot liquid with traces of pyridine or another suitable catalyst such as a carbonate salt (for example $Na_2CO_3$, $K_2CO_3$, $Cs_2CO_3$, or $KHCO_3$), an acetate salt (for example $CH_3CHOONa$, $CH_3COOK$, $(CH_3COO)_2Ca$, $(CH_3COO_2)Mg$), or $CuSO_4$. The decolorizing mixture should contain no more than 200 ppm pyridine, which is the maximum allowed by the US Food and Drug Administration. The mixture is stirred for at least 5 minutes. The result is a liquid of dark yellow-light orange. Any excess acetic acid can be neutralized with a base such as sodium bicarbonate or potassium bicarbonate to improve taste. In preferred implementations, the molar ratio of acetic anhydride added to the beetroot liquid and the neutralizing base should be 1:1. However, in some cases, a more acidic product is preferred. Thus, the molar ratio of acetic anhydride added to the beetroot liquid and the neutralizing base is less than 1 mole acetic acid to 1 mole bicarbonate, for example, 2:1, 3:1, 4:1, 5:1, 6:1, 7:1, 8:1, 9:1, or 10:1.

Figure 2A:
FIGS. 2A-2C show change in color of beet juice following decolorization.
Figure 2B:
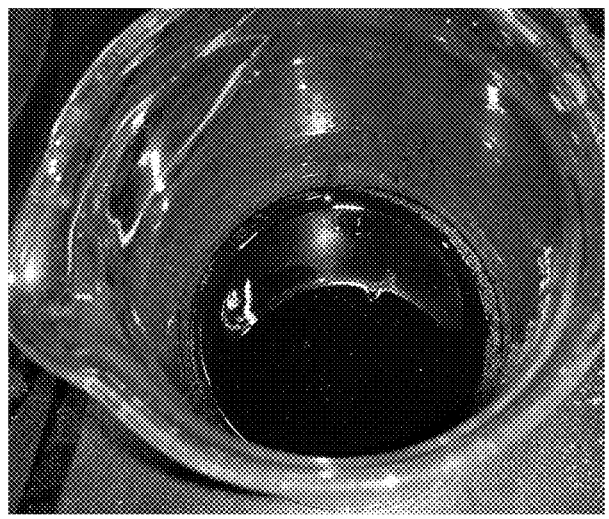
Figure 2C:
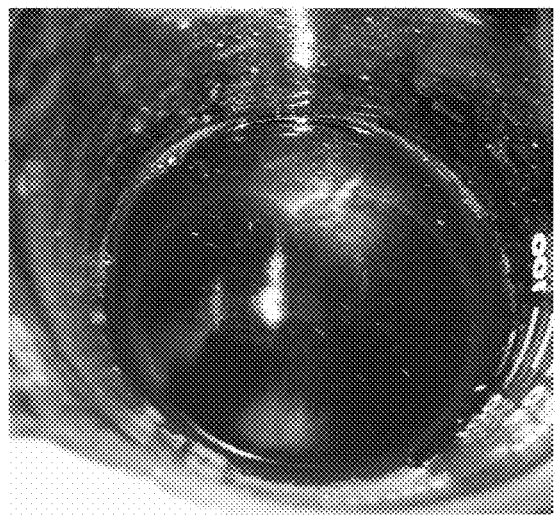

Composition 3:
Beetroot liquid
0.1% w/w and 50% w/w acetic anhydride
Trace amount of pyridine
Potassium (or sodium) bicarbonate Decolorized Beet Juice does not Stain:

Beet juice treated with the decolorizing methods of the invention have a dark brown color, as seen in FIGS. 2A-2B, rather than become colorless. However, the remaining color of decolorized beet juice does not stain, unlike untreated beet juice. While the decolorized beet juice can leave a slight yellow residue on clothes (see FIG. 1A), the color can be removed from the fabric by just washing in warm water for one minute (see FIG. 1B).

We claim:

1. A decolorized beet composition produced by a method comprising:
   providing a liquid made from beets, wherein the beets are from *Beta vulgaris*, Conditiva group;
   adding a decolorizing agent to the liquid made from beets to produce a decolorizing mixture, the decolorizing agent is selected from the group consisting of: magnesium (Mg) and acetic anhydride; and
   mixing the decolorizing mixture for at least five minutes to produce a decolorized liquid made from beets.

2. The decolorized beet composition of claim 1, wherein the decolorized beet composition is in a liquid form.

3. The decolorized beet composition of claim 2, wherein the decolorized beet composition comprises a beet product selected from the group consisting of: beetroot juice, beetroot extract, beetroot tincture, and beetroot jam.

4. The decolorized beet composition of claim 1, wherein the decolorized beet composition is in a solid form.

5. The decolorized beet composition of claim 4, wherein the decolorized beet composition comprises a beet product is selected from the group consisting of: beetroot powder, powdered beetroot extract, and beetroot juice powder.

6. The decolorized beet composition of claim 1, wherein the molar ratio of the ratio of the decolorizing agent to the amount of pigment in the liquid made from beets is 1:1.

7. The decolorized beet composition of claim 1, wherein the decolorizing agent is magnesium (Mg) in its pure form.

8. The decolorized beet composition of claim 7, wherein the magnesium (Mg) in its pure form is in a quantity of 0.1%-5% w/w.

9. The decolorized beet composition of claim 1, wherein the molar ratio of the decolorizing agent to the amount of pigment in the liquid made from beets is 1:1.

10. The decolorized beet composition of claim 1, wherein the molar ratio of the ratio of the decolorizing agent to the amount of pigment in the liquid made from beets is no more than 20% less than 1:1.

11. The decolorized beet composition of claim 7, wherein the decolorizing agent is acetic anhydride, and wherein the composition further comprises a pyridine.

12. The decolorized beet composition of claim 11, wherein the amount of the pyridine is no more than 200 ppm.

13. The decolorized beet composition of claim 1, wherein composition further comprises a base.

14. The decolorized beet composition of claim 13, wherein the molar ratio of the base to the decolorizing agent is between 0.1:1 and 1:1.

15. The decolorized beet composition of claim 13, wherein the molar ratio of base to the decolorizing agent is 1:1.

16. The decolorized beet composition of claim 13, wherein the base is a bicarbonate.

17. The decolorized beet composition of claim 14, wherein the base is a bicarbonate.

18. The decolorized beet composition of claim 15, wherein the base is a bicarbonate.

19. The decolorized beet composition of claim 16, wherein the bicarbonate is sodium bicarbonate or potassium bicarbonate.

20. The decolorized beet composition of claim 17, wherein the bicarbonate is sodium bicarbonate or potassium bicarbonate.

21. The decolorized beet composition of claim 18, wherein the bicarbonate is sodium bicarbonate or potassium bicarbonate.

* * * * *